(12) United States Patent
Knape et al.

(10) Patent No.: US 6,321,250 B1
(45) Date of Patent: Nov. 20, 2001

(54) DATA COMMUNICATION SYSTEM AND METHOD FOR TRANSPORTING OBJECTS OVER A PERMANENT CONNECTIONS

(75) Inventors: Anthony Brian Knape, Dallas; Bruno Melloni, Plano, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/164,300

(22) Filed: Oct. 1, 1998

(51) Int. Cl.[7] .................................................. G06F 15/16
(52) U.S. Cl. ........................ 709/203; 709/200; 709/217; 709/219; 709/223; 709/224; 709/227; 709/229
(58) Field of Search .................................. 709/200–203, 709/217–219, 227–229, 231, 238–242, 223–225; 713/200–201, 152–154

(56) References Cited

U.S. PATENT DOCUMENTS

| | | | |
|---|---|---|---|
| 5,630,116 | * 5/1997 | Takaya et al. | 709/201 |
| 5,754,774 | 5/1998 | Bittinger et al. | 709/203 |
| 5,754,830 | 5/1998 | Butts et al. | 709/203 |
| 5,778,187 | 7/1998 | Monteiro et al. | 709/231 |
| 5,796,393 | 8/1998 | MacNaughton et al. | 345/329 |
| 5,835,724 | * 11/1998 | Smith | 709/227 |
| 5,870,544 | * 2/1999 | Curtis | 709/229 |
| 5,889,942 | * 3/1999 | Orenshteyn | 709/201 |
| 5,956,484 | * 9/1999 | Rosenberg et al. | 709/203 |
| 6,021,443 | * 2/2000 | Bracho et al. | 709/241 |
| 6,038,599 | * 3/2000 | Black et al. | 709/223 |
| 6,055,239 | * 4/2000 | Kato | 709/227 |
| 6,088,796 | * 7/2000 | Cianfrocca et al. | 713/152 |
| 6,157,618 | * 12/2000 | Boss et al. | 709/224 |

OTHER PUBLICATIONS

Microsoft Press "Computer Dictionary", p. 192 and 329, 1997.*
ISR for PCT/US 99/22982 Completed Mar. 20, 2000.

* cited by examiner

Primary Examiner—Bharat Barot
(74) Attorney, Agent, or Firm—Jenkens & Gilchrist, P.C.

(57) ABSTRACT

A data communication system for communicating objects of virtually any size and type. The system includes at least one server and at least one client. When an object is to be transferred between the server and the client or between two servers, a permanent connection is established therebetween. The object to be transferred may include entire applications including code and data therefor, or data feed objects. The server may include server programs to generate the object to be transferred. Display objects executing on the client may request or subscribe to the object. The object-oriented communication provides an effective and flexible procedure for broadcasting an object to a number of servers in the computer network.

36 Claims, 5 Drawing Sheets

DATA COMMUNICATION SYSTEM AND METHOD FOR TRANSPORTING OBJECTS OVER A PERMANENT CONNECTIONS

BACKGROUND OF THE INVENTION

1. Technical Field of the Invention

The present invention relates to a data communication system, and particularly to a data communication protocol and corresponding computing network.

2. Background of the Relevant Art

Communication over the world wide web ("web") is limiting in a number of ways. The hypertext transfer protocol (HTTP) is an internet protocol which is employed to convey information between a web browser and web server. The HTTP is simplistic in that it is a stateless protocol wherein data is transferred between client and server as a one time event. A non-permanent connection is established in which data is transferred between a server and a browser at the client computer in the form of a request for information by the client or a response thereto provided by the server. Data is provided to a client in response to a client request only in the form of a page of information. Due to this inflexible data communication protocol, data transfer on the web is ill-suited for transactional sequences.

In response, various work-arounds have been developed, such as browser cookies, hidden values and complex common gateway interfaces. However, such work-arounds are quick fixes which do not address a better solution to communicate data across the internet or other computing network.

SUMMARY OF THE INVENTION

The present invention overcomes shortcomings in prior data communication systems and techniques, and thereby satisfies a significant need for a simple yet extremely flexible data communication system which provides enhanced data communication features.

According to the present invention, there is provided a data communication system including at least one server and client therefor. Data is transported between the server and client as an object. Unlike data communication on the web, when communication is established between the client and server according to the present invention, a permanent connection is created and maintained. In this way, the present invention is not limited to communicating data as a one time event. Rather, a temporal interface is created for sending objects between the client and server, thus substantially increasing the complexity of data communication between a server and corresponding client.

Accordingly, the object-oriented data transfer feature of the present invention allows for data transfer of objects of virtually any size and type. For instance, in addition to an object comprising data relating to a search query, an object may preferably comprise an entire application including program code and corresponding data. In addition, an object may be a data feed object in which data is provided by the server to a subscriber client on a periodic or continuous basis.

The present invention is suited for data communication between a server and a number of different client types. For instance, the present invention preferably includes one or more gateways for translating any object into a format that is compatible with the particular client. By translating the same database or content feeds to a number of different communication devices, the present invention provides network communication to client devices such as cellular telephones, personal assistant devices or personal computers having both newer and older browser applications, without maintaining duplicative databases.

The object-oriented data transfer feature of the present invention leads to an enhanced mechanism for data transport across a relatively large network having many servers therein. The servers are linked together such that each server has the ability to inform other servers what information and/or services it can provide. Due to the interconnectivity between the servers in the network, clients residing on other servers then can subscribe to these services.

In a first example, a small, local server may provide a data feed object to a larger server which is capable of distributing the data feed object to those servers/clients having subscriptions therefor. In this way, a small machine having little bandwidth is capable of distributing and/or broadcasting information (via a data feed) to a large number of subscribers.

In a second example, a single server may distribute an object to a number of first servers in the network which subscribe to receiving the object, each of which thereupon distributes the same object to a number of second servers in the network which also subscribe to receiving the object. In this way, the present invention provides for the massive distribution and/or broadcast of data.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
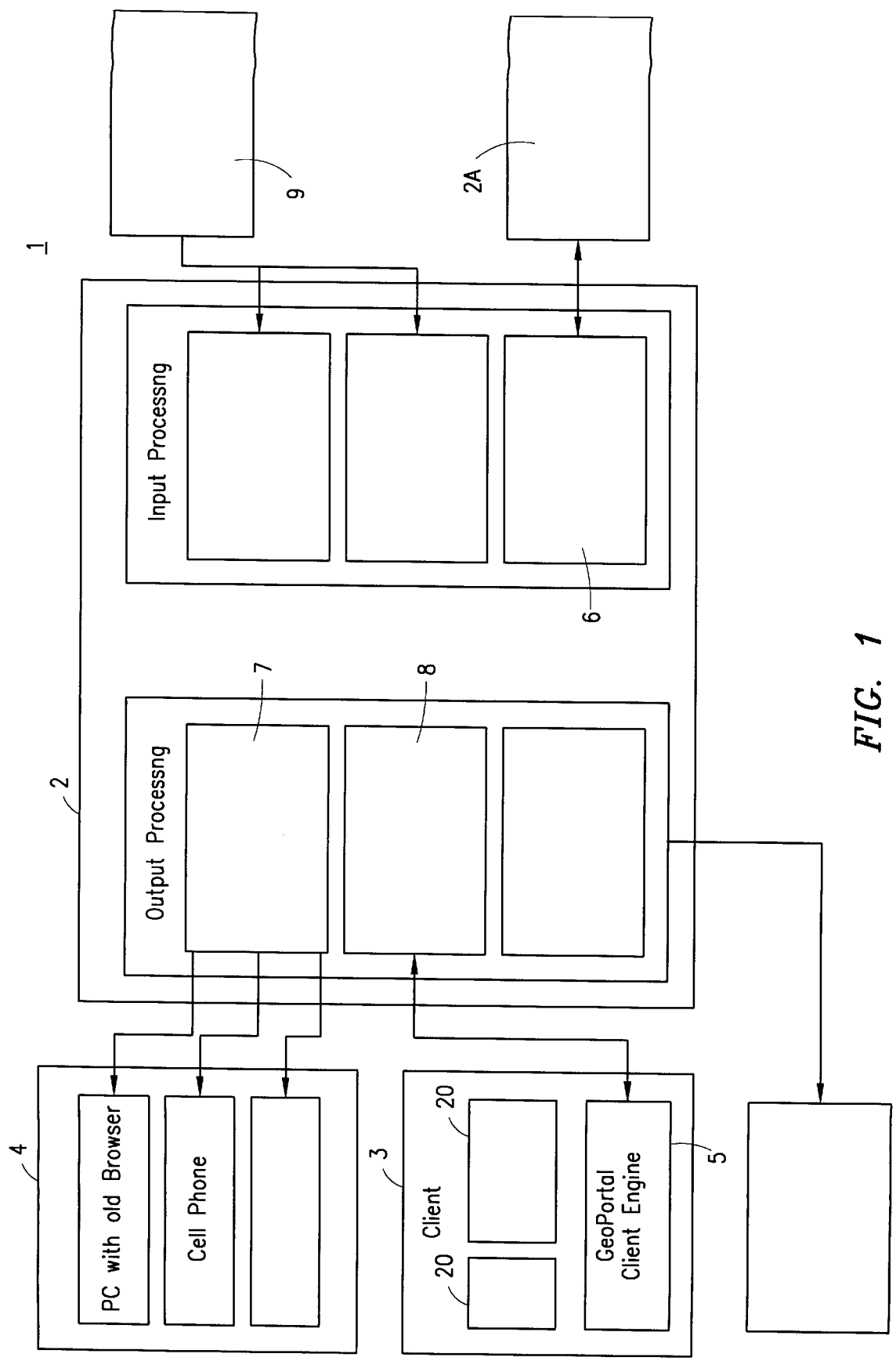
FIG. 1 is a block diagram illustrating the network architecture of the present invention.
Figure 2:
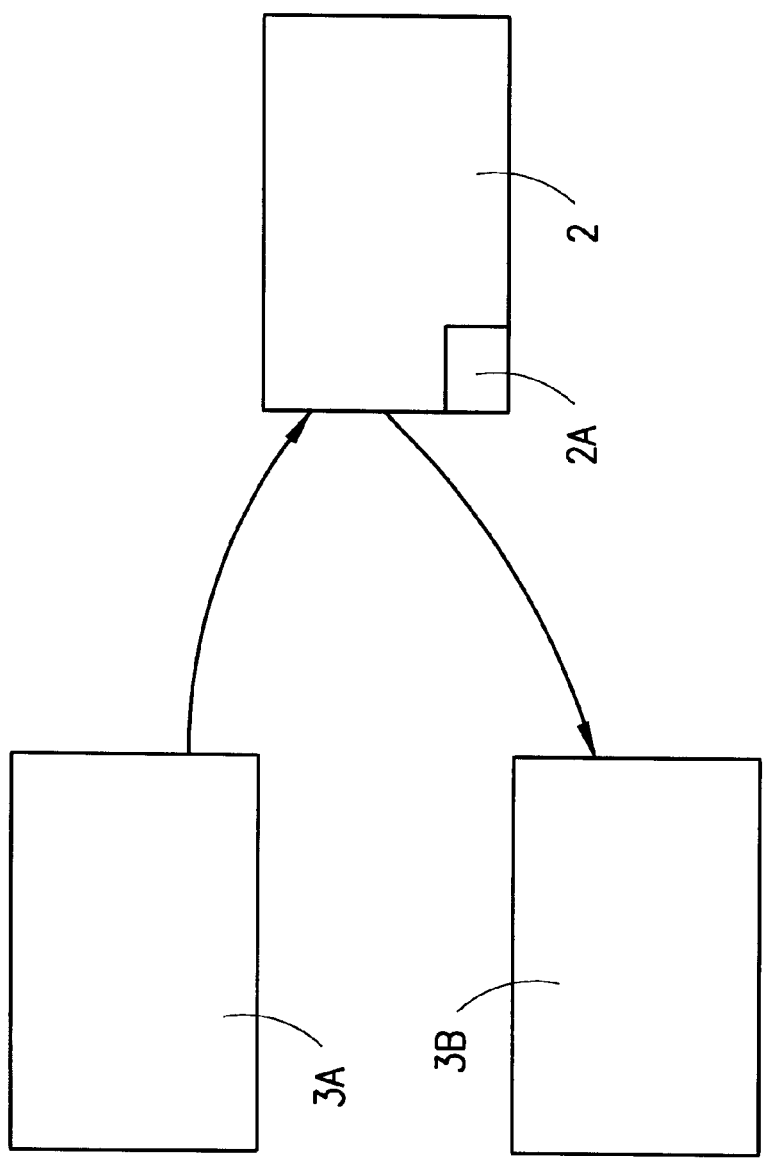
FIG. 2 is a block diagram illustrating the object transfer protocol of the present invention.
Figure 3:
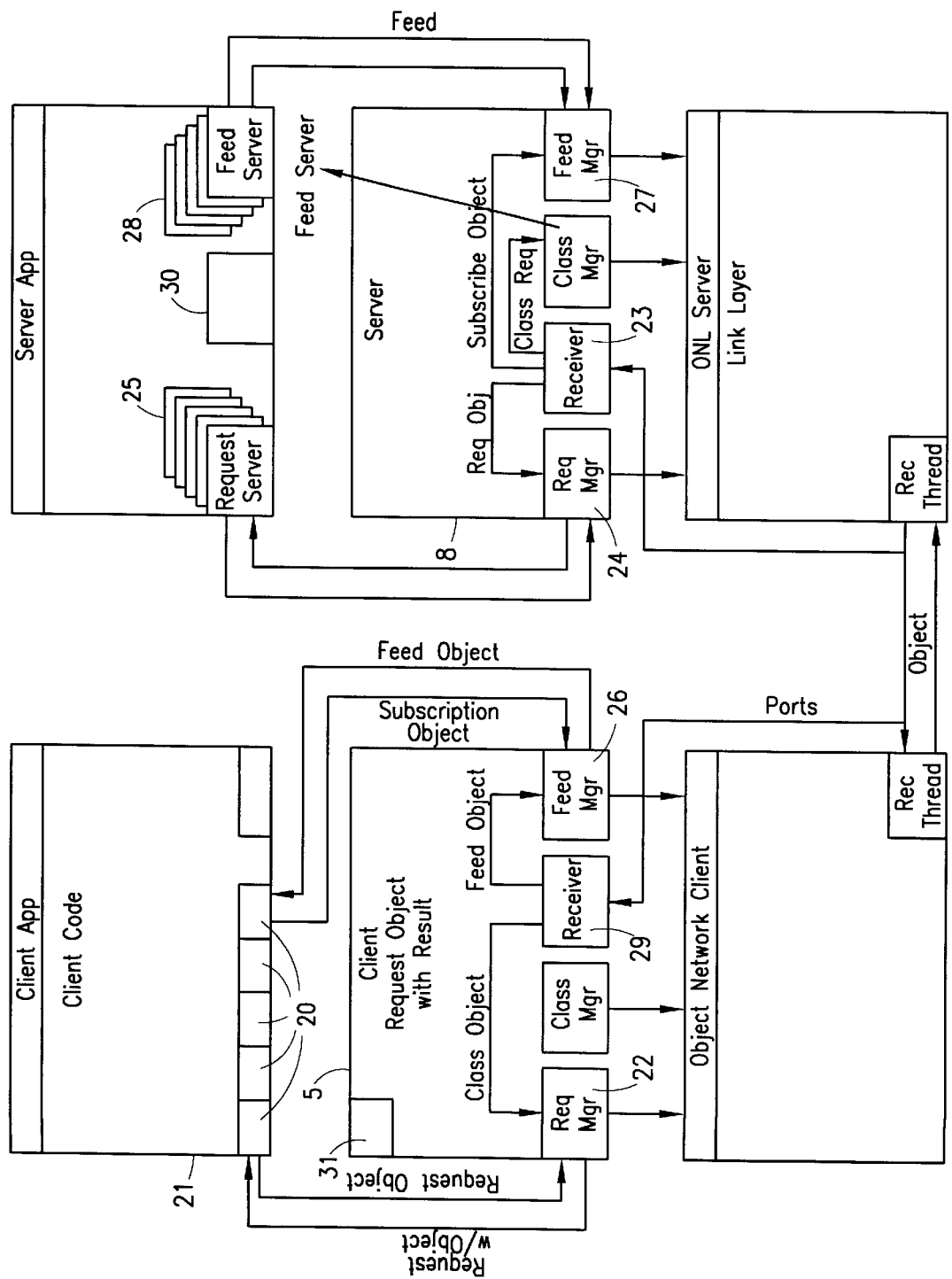
FIG. 3 is a diagram illustrating the communication between a client and server according to the present invention.
Figure 4:
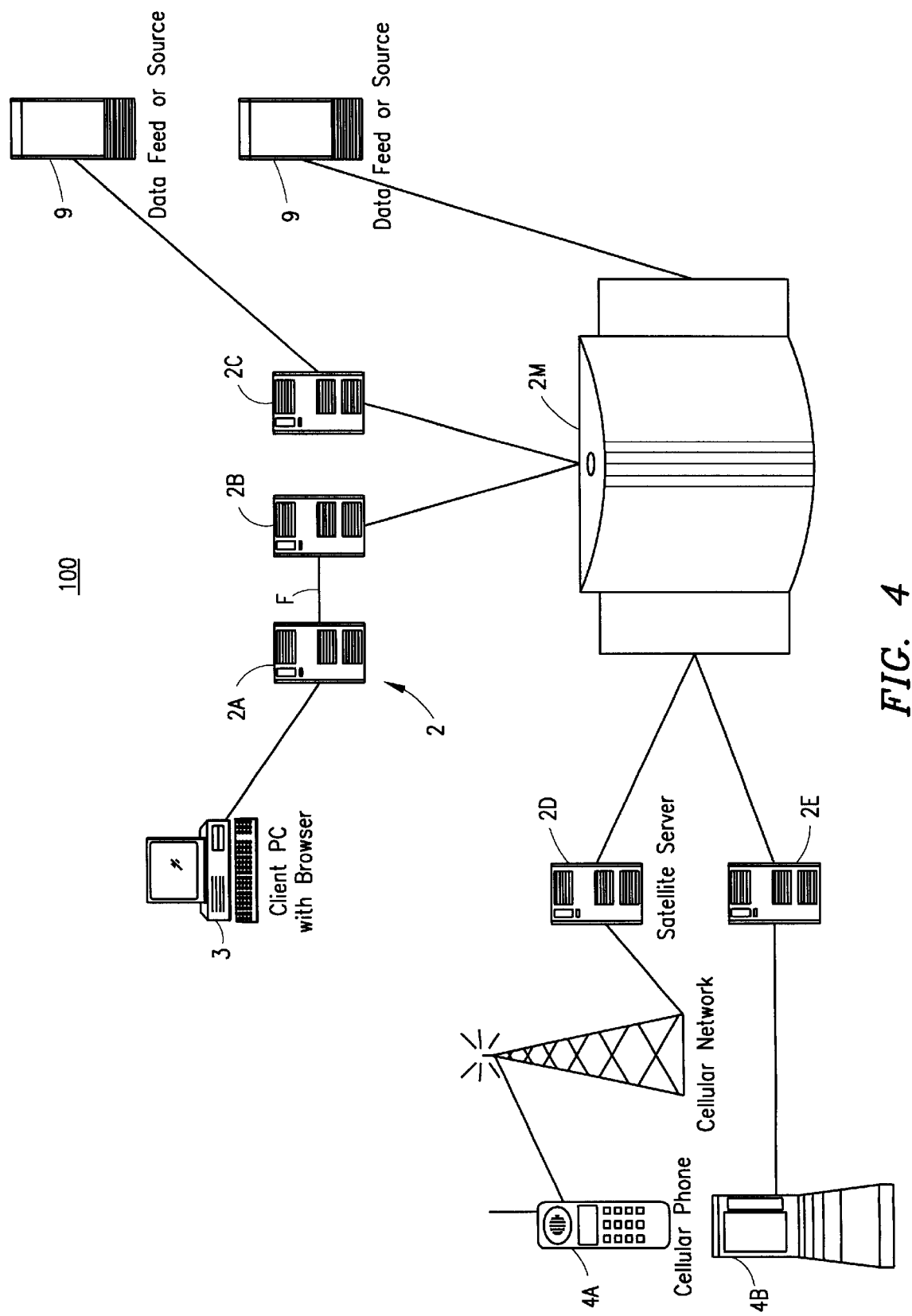
FIG. 4 is a block diagram illustrating the network according to the present invention.
Figure 5:
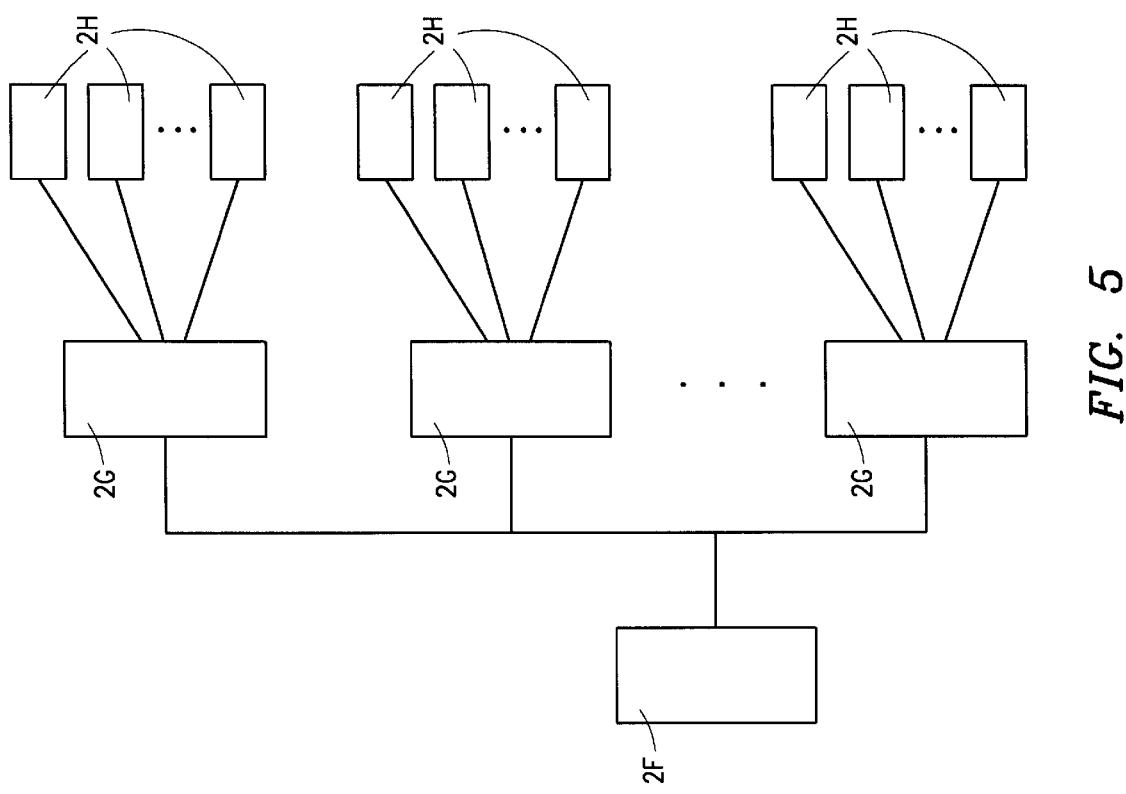
FIG. 5 is a block diagram illustrating a broadcast feature of the present invention.

Referring to FIGS. 1–5, there is shown a data communication system 1 including server 2, client 3 and electronic devices 4. Data communication system 1 is preferably a subnetwork of network 100 (FIG. 4). Client 3 communicates with server 2 and with other clients in network 100 via server 2. In a preferred embodiment of the present invention, network 100 comprises a network for the web. Alternatively, network 100 may comprise other communication networks, including local area networks and wide area networks. Client 3 preferably executes an application or an environment 21 in which one or more display objects 20 run (FIG. 3).

Server 2 and client 3 include server engine 8 and client engine 5, respectively, which handle the communication between server 2 and client 3. It is understood that the present invention is directed towards data communication between two computing devices, server 2 and client 3, and that server 2 and client 3 may suitably comprise any pair of computing devices (client-server, server-server, client-client) without necessarily being limited to server-client functionality. Server 2 may further include client engine 6 for communication with another server 2A in network 100.

According to the present invention, a request for connection between engine 8 of server 2 and engine 5 of client 3 is first made. Responsive thereto, server 2 and/or client 3 establish a permanent connection between server 2 and client 3. Thereafter, requests for communication between server 2 and a display object 20 running on client 3 are handled through this established permanent connection. Requests for communication between server 2 and other clients 3 or other display objects 20 running on client 3 may result in additional permanent connections being established to server 2 at other ports therealong. A permanent connection established between server 2 and client 3 preferably carries identification, including port identification, that is accessible by both server 2 and client 3, as well as suitable encryption. Permanent connections established between server 2 and client 3 allow, among other things, for more efficient and straight forward exchanges of information therebetween.

Significantly, permanent connections established between server 2 and corresponding client 3 further provide for more complex data transfer therebetween. Unlike data transport using HTTP in which a single page of data is transported from a server to a corresponding client in response to a client request, data transfer is more open-ended according to the present invention. Specifically, the present invention sends data objects between server 2 and client 3. Any request for data is in the form of a transported object. No remote calls are made in the present invention. Unlike data transfer utilizing HTTP and HTML in which data corresponding to a new page of information is transported from server 2 to client 3, data objects of virtually any size and type may be transported between server 2 and client 3. For instance, a transported data object may be as little as a few bytes of data or as large as that which can possibly be stored on the client computer. Without any of the object size constraints that exist in sending objects in prior data communication systems, the present invention is more suitably adapted for virtually any type of data communication.

The present invention preferably utilizes the computer program language JAVA to transfer objects between computers in data communication system 1. The JAVA language has been previously utilized to provide server functionality by sending certain object types between a server and client only in relation to a client making a request and/or function call (RMI) to a server program, and the server generating and sending a request result thereto. Data communication system 1, however, is not limited to sending certain object types associated with a client request. Rather, data communication 1 is capable of sending substantially any data. As a result, flexibility in the manner of communicating between server 2 and client 3 substantially increases.

In a preferred embodiment of the present invention, data communication system 1 is capable of sending objects therein which fall into at least three distinct categories. First, transported objects may be applications, including application code and corresponding data therefor. A first client 3A (FIG. 2), for instance, may create, update or otherwise possess an application and current data therefor. According to the present invention, the first client 3A may then send the application and corresponding data to a second client 3B via server 2. As shown in FIG. 2, server 2 may preferably store all object code which is transported therethrough in memory 2A and approve the transport of the application object prior to sending the application object to client 3B. When the application object is received by client 3B, the application may be executed thereon.

According to the present invention, the second type of transportable object is an object associated with a request. A request for data is preferably initiated by a display object 20 executing on client 3, such as with an HTTP GET command. Unlike data communication currently existing on the web, the transported object received by a display object 20 from server 2 may be data which is not displayed on client 3. For example, a transported object may be utilized in the background of a display object 20 and thus not ever be seen by a user. Alternatively, a transported object may not be displayed on client 3 until, if at all, a period of time has elapsed. If a display object 20 on client 3 includes a number of links or hyperlinks, the display object 20 may preferably request the data associated with each link/hyperlink from server 2 prior to a user informing the display object 20 that such data is requested. In this way, if a user selects a hyperlink, the corresponding data therefor, having been previously requested by display object 20, is immediately available to the user, thereby reducing response time.

The particular protocol for sending an object associated with a request by client 3 to server 2 is illustrated in FIG. 3. With a permanent connection already established between client 3 and server 2, a display object 20 in client application or environment 21 initiates a request for data by contacting a request manager 22 in client engine 5. Request manager 22 logs the display object 20 making the request for data, and the request for data passes through receiver 23 to request manager 24 of server 2. Request manager 24 performs a number of tasks. First, request manager 24 maintains connection identification data corresponding to the request so that the request response is transmitted through the appropriate permanent connection. In addition, request manager 24 determines if server 2 can handle the particular request. If it is determined that server 2 can handle the request, request manager 24 identifies the request sever program 25 which can best respond to the request. Each request server program 25 preferably handles a distinct type of request. Next, the identified request server program 25 generates a response to the request which is sent to request manager 24. Request manager 24 then recalls the identification connection through which the request was received, and transmits the request response through the same connection. If it is determined that server 2 is unable to suitably respond to the particular request, request manager 24 searches for and initiates communication with another server which is capable of responding thereto.

Once client 3 receives the request response, the response is sent to request manager 22 via receiver 29, which thereupon identifies display object 20 as the object that originally made the request, and sends the response thereto.

A third type of transportable object is a data feed object. A data feed object is more easily supported due to a permanent connection being established between server 2 and client 3. The data feed may preferably be a continuous feed of data, such as live video, a semi-continuous feed of data between server 2 and client 3, or an object which is periodically or occasionally created and transported in response to virtually any event.

Referring again to FIG. 3, a display object 20 may subscribe to a particular data feed by contacting feed manager 26 of client engine 5. Feed manager 26 logs which display object 20 requested the data feed subscription request, initiates a permanent connection with server 2 and transmits the data feed subscription request to feed manager 27 of server engine 8 via receiver 23. Feed manager 27 maintains a first log of those permanent connections associated with data feed subscriptions and a second log of available data feed server programs 28. Upon feed manager 27 logging the permanent connection associated with the recently received feed object subscription and verifying that the requested feed object is capable of being provided by server 2, the subscription to a data feed is complete.

Server 2 preferably includes a plurality of feed server programs 28, each of which provides a particular feed object to feed manager 27 for distribution to those clients 3 which subscribed to the feed object. Feed server programs 28 are each programmed to provide a particular data feed. Server 2 may also receive a data feed from an external data feed source 9 (FIGS. 1 and 4).

When feed manager 27 receives a feed object from a feed server program 28, it identifies those connections corresponding to clients 3 which subscribed to the received feed object and sends the received feed object thereto. Upon receipt of the feed object, feed manager 26 of each client 3 identifies the display object 20 which subscribed thereto, by comparing the identification of the feed with the log (maintained by feed manager 26) of those display objects 20 which subscribe to data feeds. The feed object is then sent to the appropriate display object 20.

One example of sending of a feed object is with respect to clock synchronization. In order to synchronize each client 3 and server 2 within network 100, each server 2 is preferably synchronized to the atomic clock and includes a clock feed server program 30. In addition, each client engine 5 preferably includes a clock object 31. On a periodic basis, such as once an hour, clock feed server program 30 sends a clock feed which is eventually received by each client 3 and particularly clock object 31 therein. Clock object 31 employs the clock feed to calculate a time delta between the computer clock for client 3 and the time reported in the clock feed.

A display object 20, which may display the time of day, periodically updates its display by accessing the time data maintained by clock object 31. In this way, server 2, client engine 5 and each display object 20 which may display the current time are synchronized.

Some devices 4 exist, such as cellular telephones, personal assistant devices and personal computers having outdated browser applications, which cannot effectively communicate data within various computing networks, such as the web. Accordingly, the present invention preferably allows devices 4 which do not have a suitable interface or are otherwise incapable of fully communicating within data communication system 1 to communicate objects with server 2 and client 3. Specifically, server 2 preferably includes one or more gateways 7 associated with server engine 8. Gateway 7 translates objects transported from server engine 8 so that such objects may be utilized by devices 4. By employing gateway 7, client 3 and each device 4 operate on the same data. As a result, the present invention provides a suitable interface for communicating objects of various sizes and types without maintaining duplicative or redundant databases.

The ability to transfer virtually any type of object, as explained above, leads to an efficient and rapid way to broadcast the object throughout network 100. Specifically, network 100 may preferably include servers 2A–2E (FIG. 4), master server 2M, at least one client 3 associated with a server 2A, cellular telephone 4A associated with server 2D and personal assistant 4B associated with server 2E. Servers 2A–2E and 2M are preferably linked to each other and each is preferably capable of informing the other servers 2 of the data and/or services which are available therefrom. Such data and/or services may be provided for free or for a fee, depending upon the nature of the data/service. With each server 2 being capable of transferring objects to other servers 2 within network 100 in the manner described above, the interconnection of servers 2 yields a massive network of content having enhanced performance.

For example, consider the situation in which server 2A is a small, local server which communicates to the remaining servers 2B–2E and 2M and respective subscribers through server 2B via a single data feed F(FIG. 4). When a data feed object is generated by a feed server program 28 (as described above with respect to FIG. 3), the data feed object is transmitted from server engine 2 of server 2A to server engine 6 of server 2B. Server 2B then sends the received data object to all of the other servers in network 100 having a subscription to the data feed. In this way, a small machine having a limited bandwidth (a single data feed connection) may nonetheless broadcast data to a potentially large number of servers.

Consider further the situation in which server 2F which provides a service, such as a news service, to a number of other regional servers 2G which subscribe to the service. Suppose that each regional server 2G provides this same news service to a number of other subscribing servers 2H. Whenever server 2F distributes a news-related object to subscribing servers 2G, each subscriber server 2G thereupon distributes the news-related object to subscribing servers 2H. As can be seen, this multi-level broadcasting scheme provides a way to send data to a potentially huge number of people.

Although the preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A data communication system, comprising:
   a server having a server engine; and
   a client having a client engine that communicates with the server engine of the server, wherein the server engine and the client engine selectively establish and maintain a permanent connection between a port on the server and a port on the client for sending objects between the server and the client on the permanent connection in response to a plurality of distinct requests for an object, the objects including one or more data feed objects transported substantially regularly over the permanent connection.

2. The system of claim 1, wherein:
   the objects include a computer-related application.

3. The system of claim 2, wherein:
   the computer-related application includes computer language code and data.

4. The system of claim 1, wherein:
   the client and server include data feed manager for allowing a client application on the client to subscribe to the one or more data feed objects.

5. The system of claim 4, wherein:
the one or more data feed objects is sent to the client over the permanent connection upon the client application subscribing to the one or more data feed objects.

6. The system of claim 4, wherein:
the server includes a plurality of feed server programs for generating various data feed objects; and
the data feed manager of the server identifies a particular feed server program to generate the subscribed-to data feed object.

7. The system of claim 6, wherein:
the data feed manager of the server determines whether the server is capable of providing the subscribed-to data feed object to the client application.

8. The system of claim 1, wherein:
the server maintains identification information of the port information of the permanent connection and utilizes the identification information for sending any of a plurality of objects over the permanent connection to the client engine.

9. The system of claim 1, wherein:
the client includes an application for executing a plurality of display objects, each display object being capable of requesting an object from the server.

10. The system of claim 1, wherein:
the server is a web server.

11. The system of claim 1, wherein:
the server and client engines maintain a record of the permanent connection, including a identification of the ports utilized therein.

12. The system of claim 1, wherein:
the client includes a client application; and
in response to all requests for objects by the client application, the server engine transports objects over the permanent connection.

13. A method for communicating between a web client and a web server, comprising the steps of:
in response to a request by the web client and the web server, establishing and maintaining a permanent connection between a port on the web server and a port on the web client; and
transporting objects between the web server and the web client on the permanent connection in response to a plurality of distinct request for the objects, the objects comprising substantially regularly transported feed of data.

14. The method of claim 13, wherein:
the objects include a computer application.

15. The method of claim 13, wherein:
the objects include a computer application code and data therefor.

16. The method of claim 13, wherein:
the substantially regularly transported objects comprise a substantially continuous feed of data.

17. The method of claim 13, further including the steps of:
initially subscribing to a data feed provided by the web server;
wherein the objects transported in the step of transporting comprises the data feed; and
the data feed is substantially continuously transported to the web client in the step of transporting based upon the step of initially subscribing to the data feed.

18. The method of claim 17, further including a step of:
identifying a feed server program for generating the data feed to be transported to the web client during the step of transporting.

19. The method of claim 17, further including a step of:
determining whether the web server is capable of providing the subscribed-to data feed.

20. The method of claim 13, further including the steps of:
initially receiving a request for an object from the web server; and
selecting a request server program on the web server for providing the requested object.

21. The method of claim 13, wherein:
the step of establishing a permanent connection includes the step of maintaining an identification of port information for the permanent connection; and
the step of transporting includes the steps of determining the identification of the permanent connection based upon the maintained portion information and sending the object over the permanent connection based upon the step of determining.

22. The method of claim 13, further including the steps of:
executing a plurality of display objects on the web client; and
requesting an object by a display object to the web server;
wherein the step of transporting objects is responsive to the step of requesting an object.

23. The method of claim 22, further including the step of:
maintaining the identity of the display object requesting the object.

24. A computer program product including a computer readable medium having computer readable program code means embodied thereon, for communicating data between a client and a server in a computer network, the computer program product comprising instructions for:
establishing and maintaining a non-temporary connection between a port on the client and a port on the server: and
transporting objects between the client and the server on the non-temporary connection of substantially any object type, the objects transported on the non-temporary connection including a data feed substantially regularly transported thereon.

25. The computer program product of claim 24, wherein:
the data feed comprises a substantially continuous data feed.

26. The computer program product of claim 24, further including instructions for:
allowing a client application to subscribe to the data feed.

27. The computer program product of claim 24, further comprising instructions for:
generating a plurality of objects, each object being selectively transported over the non-temporary connection in response to a request for the object.

28. The computer program product of claim 27, further comprising instructions for:
identifying the objects to be transported over the non-temporary connection.

29. The computer program product of claim 24, wherein:
the non-temporary connection comprises a permanent connection between the client and the server.

30. The computer program product of claim 24, further including instructions for:
maintaining a record of port information corresponding to the non-temporary connection.

31. A communications apparatus, comprising: a first server, the first server including a means for generating data feed objects, receiving subscriptions to at least one of the data feed objects from one or more communications devices, establishing and maintaining a permanent connection between a port on the first server and a port on a communication device subscribing to the at least one data feed object, and sending a data feed object substantially regularly over the permanent connection based upon a received subscription therefor.

32. The communications apparatus of claim 31, further including:

a plurality of second servers, each second server being associated with the communications device.

33. The communications apparatus of claim 32, wherein:

each second server includes a means for receiving subscriptions to the object and a means for sending the object based upon received subscriptions therefor.

34. The computer network of claim 31, wherein:

the object comprises a computer-related application.

35. The computer network of claim 31, wherein:

the first server and the one or more second servers comprise servers for the web.

36. A method of communicating between a plurality of servers in a computer network, comprising the steps of:

generating a data feed object by a first server at substantially regular times;

receiving subscriptions to the data feed object by the first server;

sending the data feed object based upon the step of receiving subscriptions by the first server at substantially regularly times over a substantially maintained permanent connection between the first server and one or more second servers;

receiving subscriptions to the data feed object by the one or more second servers;

receiving the data feed object by the one or more second servers; and sending a data feed object by the one or more second servers substantially regular time over the permanent connection based upon the step of receiving subscriptions thereby.

* * * * *